US009858303B2

(12) United States Patent
Bhattacharjee et al.

(10) Patent No.: US 9,858,303 B2
(45) Date of Patent: Jan. 2, 2018

(54) IN-MEMORY LATCH-FREE INDEX STRUCTURE

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 14/594,230

(22) Filed: Jan. 12, 2015

(65) Prior Publication Data

US 2016/0203135 A1    Jul. 14, 2016

(51) Int. Cl.
*G06F 7/00* (2006.01)
*G06F 17/30* (2006.01)

(52) U.S. Cl.
CPC .... *G06F 17/3033* (2013.01); *G06F 17/30949* (2013.01)

(58) Field of Classification Search
CPC .................................. G06F 17/30949
See application file for complete search history.

(56) References Cited

U.S. PATENT DOCUMENTS

| | | | |
|---|---|---|---|
| 5,960,434 A * | 9/1999 | Schimmel | G06F 17/30949 |
| 6,067,547 A * | 5/2000 | Douceur | G06F 17/3033 |
| 6,931,418 B1 | 8/2005 | Barnes | |
| 7,287,131 B1 * | 10/2007 | Martin | G06F 17/30949 707/999.101 |
| 2001/0042204 A1 * | 11/2001 | Blaker | G06F 17/30949 713/165 |
| 2004/0107227 A1 * | 6/2004 | Michael | G06F 9/5016 |
| 2009/0228455 A1 | 9/2009 | Hirsch et al. | |
| 2010/0094870 A1 | 4/2010 | Narang et al. | |
| 2010/0185703 A1 | 7/2010 | Ylonen | |
| 2011/0246503 A1 * | 10/2011 | Bender | G06F 17/30306 707/769 |
| 2012/0323926 A1 | 12/2012 | Nath et al. | |
| 2012/0323970 A1 | 12/2012 | Larson et al. | |

FOREIGN PATENT DOCUMENTS

| | | |
|---|---|---|
| WO | 2008102195 A1 | 8/2008 |
| WO | 2011006203 A1 | 1/2011 |
| WO | 2012148616 A1 | 11/2012 |

OTHER PUBLICATIONS

Diaconu, et al.; "Hekaton: SQL Server's Memory-Optimized OLTP Engine"; SIGMOD'13; Jun. 22-27, 2013; New York, New York.
(Continued)

*Primary Examiner* — Charles Lu
(74) *Attorney, Agent, or Firm* — Edward J. Wixted, III (57) ABSTRACT

In an approach for supporting queries for hash-based data structures, a processor creates an ordered set of seeds, wherein the ordered set of seeds are a subset of values in a key domain. A processor links each hashed key of a plurality of hashed keys to at least another hashed key of the plurality of hashed keys using the ordered set of seeds, wherein the ordered set of seeds allows retrieval access to data located in the hash-based data structure.

17 Claims, 7 Drawing Sheets

(56) References Cited

OTHER PUBLICATIONS

Fagin, et al.; "Extendible hashing—a fast access method for dynamic files"; ACM Digital Library; vol. 4; Issue 3; Sep. 1979; pp. 315-344; Printed Sep. 24, 2014; <http://dl.acm.org/citation.cfm?id=320092>.

Gavalda, et al.; "Dermi: A New Distributed Hash Table-Based Middleware Framework"; Published by the IEEE Computer Society; May-Jun. 2004.

Isard, et. al.; "Dryad: Distributed Data-Parallel Programs from Sequential Building Blocks"; EuroSys'07; Mar. 21-23, 2007; Lisboa, Portugal.

Larson, Per-Ake; "Dynamic hash tables"; Communications of the ACM; vol. 31; Issue 4; Apr. 1988; pp. 446-457; Printed Sep. 24, 2014; <http://dl.acm.org/citation.cfm?id=42410>.

Larson, et al; "High-Performance Concurrency Control Mechanisms for Main-Memory Databases"; The 38th International Conference on Very Large Data Bases; Aug. 27-31, 2012; Istanbul, Turkey; Proceedings of the VLDB Endowment; vol. 5; No. 4; Copyright 2011.

Levandoski, et al.; "The Bw-Tree: A B-tree for New Hardware Platforms".

Litwin, Witold; "Linear hashing; a new tool for file and table addressing" VLDB '80 Proceedings of the sixth international conference on Very Large Data Bases; vol. 6; pp. 212-223; Printed Sep. 24, 2014; <http://dl.acm.org/citation.cfm?id=1286911>.

Michael, et al.; "Hazard Pointers: Safe Memory Reclamation for Lock-Free Objects"; Published by the IEEE Computer Society; IEEE Transactions on Parallel and Distributed Systems; vol. 15; No. 6; Jun. 2004.

Morris, Robert; "Scatter storage techniques"; Communications of the ACM; vol. 11; Issue 1; Jan. 1968; pp. 38-44; Printed Sep. 24, 2014; <http://dl.acm.org/citation.cfm?id=362882>.

Mullin, James K.; "An improved index sequential access method using hashed overflow"; Communications of the ACM; vol. 15; Issue 5; May 1972; pp. 301-307; Printed Sep. 24, 2014; <http://dl.acm.org/citation.cfm?id=361304&dl=&coll&preflayout=tabs>.

Ray, et al; "A Distributed Hash Table based Address Resolution Scheme for Large-scale Ethernet Networks"; University of Pennsylvania Scholarly Commons; Department of Electrical & Systems Engineering; Jun. 24, 2007; Copyright 2007.

Song, et al.; "Fast Hash Table Lookup Using Extended Bloom Filter: An Aid to Network Processing" SIGCOMM'05; Aug. 22-26, 2005; Philadelphia, Pennsylvania; Copyright 2005.

Fahad Zaqout, et al.; "Indexed Sequential Access Method (ISAM): A Review of The Processing Files"; 2011 UKSim 5th European Symposium on Computer Modeling and Simulation; IEEE Computer Society; Copyright 2011.

\* cited by examiner

IN-MEMORY LATCH-FREE INDEX STRUCTURE

BACKGROUND OF THE INVENTION

The present invention relates generally to the field of online transaction processing (OLTP), and more particularly to developing a highly concurrent, low-maintenance, in-memory data structure to support a wide spectrum of queries, including point and range queries.

OLTP is a class of information systems that facilitate and manage transaction-oriented applications, typically for data entry and retrieval transaction processing. The term OLTP is somewhat ambiguous; some understand a "transaction" in the context of computer or database transactions, while others define a "transaction" in terms of business or commercial transactions. OLTP has also been used to refer to processing in which the system responds immediately to user requests. An automated teller machine (ATM) for a bank is an example of a commercial transaction processing application. Online transaction processing applications are high throughput and insert or update-intensive in database management. OLTP applications can be used concurrently by a plurality of users. The key goals of OLTP applications are availability, speed, concurrency, and recoverability. Like many modern online information technology solutions, some systems require offline maintenance, which affects the cost-benefit analysis of online transaction processing systems.

A range query is a common database operation that retrieves records where some value is between an upper and lower boundary. For example, a range query may request a list of employees with three to five years of experience. Range queries are unusual because it is not generally known in advance how many entries a range query will return, or if it will return any entries at all. Many other queries, such as the top ten most senior employees, or the newest employee, can be done more efficiently, because there is an upper bound to the number of results returned. A query that returns exactly one result is sometimes called a singleton.

In data structures, a range query requires preprocessing of some input data into a data structure to efficiently answer any number of queries on any subset of the input. Particularly, there is a group of problems that have been extensively studied where the input is an array of unsorted numbers and a query includes computing some function on a specific range of the array.

In computer science, a data structure is a particular way of organizing data in a computer so the data can be used efficiently. Different kinds of data structures are suited to different kinds of applications, and some are highly specialized to specific tasks. For example, some databases use B-tree indexes for small percentages of data retrieval and compilers and other databases use dynamic hash tables for data retrieval. Data structures provide a means to manage large amounts of data efficiently for uses such as large databases and internet indexing services. Usually efficient data structures are key to designing efficient algorithms. Some formal design methods and programming languages emphasize data structures, rather than algorithms, as the key organizing factor in software design. Storing and retrieving can be carried out on data stored in both main memory and in secondary memory.

SUMMARY

Aspects of an embodiment of the present invention disclose a method, computer program product, and computing system for supporting queries for hash-based data structures. A processor creates an ordered set of seeds, wherein the ordered set of seeds includes a subset of values in a key domain. A processor links each hashed key of a plurality of hashed keys to at least another hashed key of the plurality of hashed keys using the ordered set of seeds, wherein the ordered set of seeds allows retrieval access to data located in the hash-based data structure.

DETAILED DESCRIPTION

There is a paradigm shift in online transaction processing (OLTP) from the perspective of both hardware and software. The hardware trends are cheaper systems, having larger main-memory, and a larger number of cores per processor. The trends are paving the way for OLTP databases to become entirely memory-resident with substantially faster latency and to potentially support more concurrent environments which exhibit substantially faster throughput. The software trend is to exploit latch-free and low-maintenance data structures to allow concurrent readers and writers of data to proceed together by minimizing contention. However, the research in the database community has been dominated by disk-based and block-accessible data structures, designed to reduce the number of random physical addresses. The research has paid little attention to latch-free (or lock-free) byte-addressable main-memory structures.

The most widely used index structures are hash table and B-Tree structures. A standard hash index is efficient for point queries, but not for range queries, while B-tree is able to do both point and range queries. However, B-Tree pays a price in performance for point queries and for inserts/updates/deletes.

Embodiments of the present invention recognize there is a need for a data structure that can do both point and range queries, while being insert/update/delete friendly. In operational data stores, there tends to be approximately 80% small queries (point-like queries) and 20% range queries, apart from inserts/updates/deletes. Thus, the ability to handle point queries with a support of range queries is beneficial. Therefore, embodiments of the present invention disclose a highly concurrent, low-maintenance, in-memory data structure to support point/range queries. The present invention presents R-Hash—an in-memory, latch-free, hash-based dominant structure that includes a novel seeding and linking mechanism to support both equality (point) and range queries and an effective hash table sharing address directory that is shared among a set of hash indexes using an indirectional level that maps each hash bucket of the hash table address directory to the set of hash indexes to reduce maintenance.

The term R-Hash is just a name. The present invention could be referred to as any other name or no name at all. The name does not imply any limitations on the present invention with regard to implementation.

Embodiments of the present invention will now be described in detail with reference to the Figures.

Figure 1:
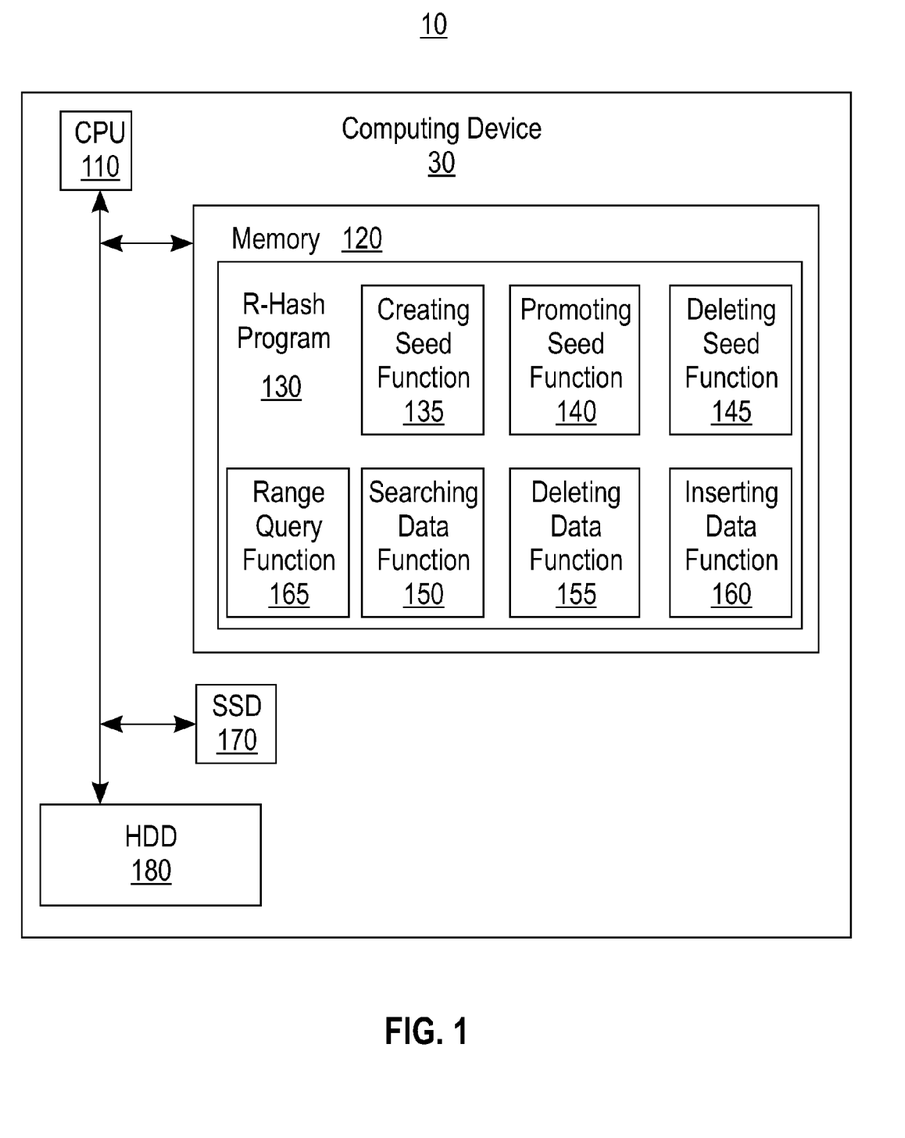
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes computing device 30. In some embodiments, computing system 10 can send and receive information over any network. The network (not shown) may be a local area network (LAN), a wide area network (WAN) such as the Internet, a cellular data network, any combination thereof, or any combination of connections and protocols that will support communications between computing device 30 and other computing devices that may send information to computing device 30 or receive information from computing device 30, in accordance with embodiments of the invention. The network may include wired, wireless, or fiber optic connections. Computing system 10 may include additional computing devices, servers, or other devices not shown.

Computing device 30 may be a management server, a web server, or any other electronic device or computing system capable of processing program instructions and receiving and sending data. In some embodiments, computing device 30 may be a laptop computer, tablet computer, netbook computer, personal computer (PC), a desktop computer, or any programmable electronic device. In other embodiments, computing device 30 may represent a server computing system utilizing multiple computers as a server system, such as in a cloud computing environment. In another embodiment, computing device 30 represents a computing system utilizing clustered computers and components to act as a single pool of seamless resources. Computing device 30 contains CPU (central processing unit) 110, memory 120, R-Hash program 130, creating seed function 135, promoting seed function 140, deleting seed function 145, searching data function 150, deleting data function 155, inserting data function 160, range query function 165, SSD (solid-state drive) 170, and HDD (hard disk drive) 180. Computing device 30 may include components, as depicted and described in further detail with respect to FIG. 9.

CPU 110 is the hardware within a computer that carries out the instructions of a computer program, such as R-Hash program 130, by performing the basic arithmetical, logical, and input/output (I/O) operations of the system. A computer can have more than one CPU; this is called multiprocessing. Modern CPUs are typically microprocessors, meaning contained on a single chip. Some integrated circuits (ICs) contain multiple CPUs on a single chip and are commonly referred to as multi-core processors. In some embodiments, computing device 30 contains one CPU 110. In other embodiments, computing device 30 contains multiple CPU 110s. In the depicted embodiment, CPU 110 resides on computing device 30. In other embodiments, CPU 110 may reside on another computing device, provided CPU 110 is accessible to R-Hash program 130.

Memory 120, or primary memory, is often associated with addressable semiconductor memory. There are two main types of semiconductor memory: volatile and non-volatile. In some embodiments, memory 120 is volatile. In some embodiments, memory 120 is non-volatile. An example of non-volatile memory is flash memory. Examples of volatile memory are dynamic random-access memory (DRAM) and static random-access memory (SRAM).

R-Hash program 130 uses a highly concurrent, low maintenance, in-memory data structure that includes a novel seeding and linking mechanism and an effective sharing address directory to reduce maintenance and support both point and range queries while being insert/update/delete friendly. In some embodiments, R-Hash program 130 resides on computing device 30. In other embodiments, R-Hash program 130 may reside on another computing device, provided that R-Hash program 130 has access to memory 120, creating seed function 135, promoting seed function 140, deleting seed function 145, searching data function 150, deleting data function 155, inserting data function 160, and range query function 165.

Creating seed function 135 creates an initial R-Hash index and initial sorted seed list on a dimension of a multidimensional data set. The initial sorted seed list is created to help maintain linking between the hashed keys. In the depicted embodiment, creating seed function 135 is a function of R-Hash program 130. In other embodiments, creating seed function 135 may be a separate program accessible by R-Hash program 130.

Promoting seed function 140 promotes seeds for an R-Hash index on a dimension of a multidimensional data set. Promoting seed function 140 adds new seeds, promotes existing hashed keys as seeds, and adjusts existing seeds, when needed. In the depicted embodiment, promoting seed function 140 is a function of R-Hash program 130. In other embodiments, promoting seed function 140 may be a separate program accessible by R-Hash program 130.

Deleting seed function 145 deletes seeds for an R-Hash index on a dimension of a multidimensional data set. Deleting seed function 145 allows a seed to be deleted when the seed is no longer needed. An example of when a seed is no longer needed occurs when there is no longer any data in the hash bucket associated with the hashed key. In the depicted embodiment, deleting seed function 145 is a function of R-Hash program 130. In other embodiments, deleting seed function 145 may be a separate program accessible by R-Hash program 130.

Searching data function 150 searches multidimensional data sets with a chosen value on a dimension using the R-Hash index on a dimension of a multidimensional data set. Searching data function 150 allows data to be found using a point query. A piece of data is used to map to the requested data associated to the initial piece of data. For example, a person's name and his or her weight. In the depicted embodiment, searching data function 150 is a function of R-Hash program 130. In other embodiments, searching data function 150 may be a separate program accessible by R-Hash program 130.

Deleting data function 155 deletes multidimensional data sets with a chosen value on a dimension using the R-Hash index on a dimension of a multidimensional data set. Deleting data function 155 allows data to be deleted when there is no longer a need for the data in question. For example, if a person changes his or her address, the old address is no longer needed; therefore, deleting data function 155 would delete the old address associated with the person. In the depicted embodiment, deleting data function 155 is a function of R-Hash program 130. In other embodiments, deleting data function 155 may be a separate program accessible by R-Hash program 130.

Inserting data function 160 inserts multidimensional data sets with a chosen value on a dimension using the R-Hash index on a dimension of a multidimensional data set. Inserting data function 160 allows new data to be added when needed. In the depicted embodiment, inserting data function 160 is a function of R-Hash program 130. In other embodiments, inserting data function 160 may be a separate program accessible by R-Hash program 130.

Range query function 165 analyzes a range query on multidimensional data sets with a chosen value range on a dimension using the R-Hash index on a dimension of a multidimensional data set. A range query consists of preprocessing some input data into a data structure to efficiently answer any number of queries on any subset of the input. A range query is a common database operation that retrieves records where some value is between an upper and lower boundary. In the depicted embodiment, range query function 165 is a function of R-Hash program 130. In other embodiments, range query function 165 may be a separate program accessible by R-Hash program 130.

In one embodiment, creating seed function 135, promoting seed function 140, and deleting seed function 145 could be performed on one computing device, while searching data function 150 and range query function 165 could be conducted by a different computing device/program. Accordingly, creating and updating the seeded data structure can be performed at one computer device, while the data structure can be queried by a different computing device. Similarly, the deleting data function 155 and inserting data function 160 may be done by a computing device that is not also processing the search or range query functions.

SSD (solid-state drive) 170 is a data storage device using integrated circuit assemblies as memory to store data persistently. SSD technology uses electronic interfaces compatible with traditional block input/output (I/O) hard disk drives (HDDs), thus permitting simple replacement in common applications. Additionally, new I/O interfaces have been designed to address specific requirements of the SSD technology. SSDs have no moving (mechanical) components, which distinguishes SSDs from traditional electromechanical magnetic disks (e.g., HDDs or floppy disks) that contain spinning disks and movable read/write heads. While electromechanical disks are cheaper, SSDs are typically more resistant to physical shock, run silently, have lower access time, and less latency. Most SSDs use NAND-based flash memory, which retains data without power. For applications requiring fast access, but not necessarily data persistence after power loss, SSDs may be constructed from random-access memory (RAM). Such devices may employ separate power sources, such as batteries, to maintain data after power loss.

HDD (hard disk drive) 180 is a data storage device used for storing and retrieving digital information, using rapidly rotating disks coated with magnetic material. An HDD retains its data even when powered off. Data is read in a random-access manner, meaning individual blocks of data can be stored or retrieved in any order, rather than sequentially. An HDD includes one or more rigid ("hard") rapidly rotating disks with magnetic heads arranged on a moving actuator arm to read and write data to the surfaces. The primary characteristics of an HDD are the HDD's capacity and performance. Capacity is specified in unit prefixes corresponding to powers of 1000: a 1-terabyte (TB) drive has a capacity of 1,000 gigabytes (GB) (where 1 gigabyte=1 billion bytes). Typically, some of an HDD's capacity is unavailable to the user because it is used by the file system, by the computer operating system, and possibly by built-in redundancy for error correction and recovery. On the other hand, performance is specified by the time to move the heads to a file (average access time) plus the time it takes for the file to move under the file's head (average latency, a function of the physical rotational speed in revolutions per minute) and the speed at which the file is transmitted (data rate).

In some embodiments, there are hybrid drives. Hybrid drives are storage devices that combine SSD with HDD technology with the intent of adding some of the speed of SSDs to the cost-effective storage capacity of traditional HDDs. The purpose of the SSD in a hybrid drive is to act as a cache for the data stored on the HDD, by keeping copies of the most frequently used data on the SSD for improved overall performance.

Figure 2:
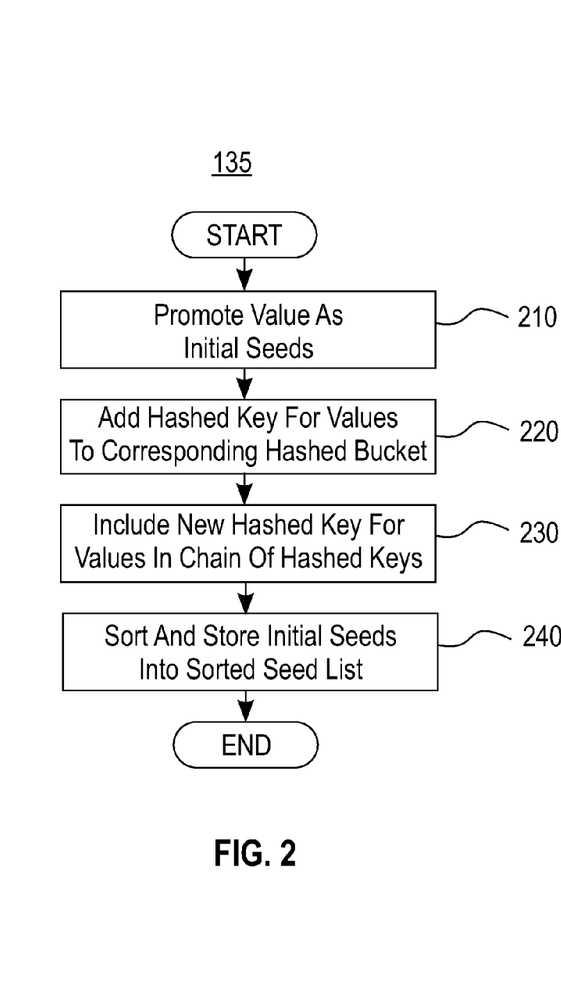
FIG. 2 depicts a flowchart of the steps of a creating seed function, executing within the computing system of FIG. 1, for creating an initial R-Hash index and initial sorted seed list on a dimension of a multidimensional data set, in accordance with an embodiment of the present invention.

FIG. 2 depicts a flowchart of the steps of a creating seed function, executing within the computing system of FIG. 1, in accordance with an embodiment of the present invention. Creating seed function 135 creates an initial R-Hash index and initial sorted seed list on a dimension of a multidimensional data set, in accordance with one embodiment of the present invention.

In step 210, creating seed function 135 promotes values as initial seeds, based on at least one of insertion history, historical data, extrapolation techniques, ranking/scoring functions, seeds distance functions, and/or domain knowledge. Seeds are a subset of values in the key domain and help maintain linking between hashed keys. In one embodiment, seeds are a subset of hashed keys. In other embodiments, seeds are a subset of unique keys from which hashed keys are derived. Still, in other embodiments, seeds are a combination of a subset of hashed keys and unique keys. The major properties of seeds are: (1) all keys (or partial keys for composite keys) are eligible for seeds, even if the key does not appear in any record; (2) seeds can be used to answer range/partial predicates of composite keys; and (3) seeds can be used for compression with forward linking or backward linking. In some embodiments, R-Hash program 130 uses forward linking. Forward linking means the hashed keys are linked from smallest to largest. In other embodiments, R-Hash program 130 uses backward linking. Backward linking means the hashed keys are linked from largest to smallest. Still, in other embodiments, R-Hash program 130 uses double linking. Double linking may improve the traversal and chaining, for example, providing both forward and backward scanning for range queries.

In step 220, creating seed function 135 adds a hashed key for values to a corresponding hashed bucket. The hashed key is created using a hash function. A hash function is any function that can be used to map digital data of arbitrary size to digital data of fixed size, with slight differences in input data producing very big differences in output data. The values returned by a hash function are called hash keys, hash values, hash codes, hash sums, or simply hashes.

In step 230, creating seed function 135 includes a new hashed key for values in a chain of hashed keys. The new hashed key is inserted into the chain of hashed keys and linking is established. The linking is essentially an insertion into a linked list of hashed keys, which can be done using a latch-free linked operation, such as hazardous pointers that rely on compare-and-swap (CAS) operations.

In step 240, creating seed function 135 sorts and stores initial seeds into a sorted seed list. In one embodiment, the seeds, which are rarely updated similar to root of a tree, are effectively maintained using a sorted list. In other embodiments, the seeds are effectively maintained using any other structure with fast retrieval access. Creating seed function 135 sorts the initial seeds according to certain selection criteria or techniques, such as the criteria and techniques listed above with reference to step 210.

Figure 3:
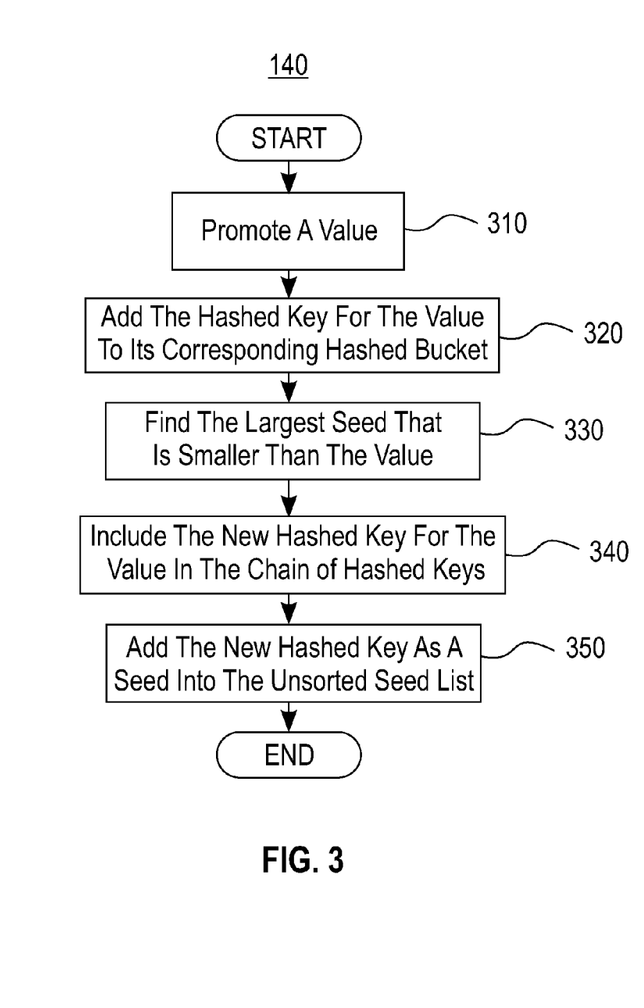
FIG. 3 depicts a flowchart of the steps of a promoting seed function, executing within the computing system of FIG. 1, for promoting seeds for an R-Hash index on a dimension of a multidimensional data set, in accordance with an embodiment of the present invention.

FIG. 3 depicts a flowchart of the steps of a promoting seed function, executing within the computing system of FIG. 1, in accordance with an embodiment of the present invention. Promoting seed function 140 promotes seeds for an R-Hash index on a dimension of a multidimensional data set, in accordance with one embodiment of the present invention.

In step 310, promoting seed function 140 promotes (selects) a value, based on at least one of insertion history, historical data, extrapolation techniques, ranking/scoring functions, seeds distance functions, and/or domain knowledge. In one embodiment, promoting seed function 140 inserts a new hashed key into the chain of hashed keys and, then, promotes the new hashed key as a seed. In other embodiments, promoting seed function 140 promotes an existing hashed key as a seed. Still, in some embodiments, promoting seed function 140 adjusts existing seeds. If adjusting, promoting seed function 140 identifies the seed that needs to be adjusted and replaces said seed with a new or existing seed.

In step 320, promoting seed function 140 adds the hashed key for the value to the corresponding hashed bucket. The hashed key is created using a hash function. A hash function is any function that can be used to map digital data of arbitrary size to digital data of fixed size, with slight differences in input data producing very big differences in output data. The values returned by a hash function are called hash keys, hash values, hash codes, hash sums, or simply hashes.

In step 330, in one embodiment, promoting seed function 140 finds the largest seed that is smaller than the value of the hashed key (for forward linking). In another embodiment, promoting seed function 140 finds the smallest seed that is larger than the value of the hashed key (for backward linking). Promoting seed function 140 finds the seed to allow the new hashed key to be linked in order with the other hashed keys in the chain of hashed keys.

In step 340, promoting seed function 140 includes the new hashed key for the value in the chain of hashed keys. Using the seed found in step 330, the new hashed key is inserted into the chain of hashed keys and linking is established. The linking is essentially an insertion into a linked list of hashed keys, which can be done using a latch-free linked operation, such as hazardous pointers that rely on compare-and-swap (CAS) operations.

In step 350, promoting seed function 140 adds the new hashed key as a seed into the unsorted seed list. By maintaining an unsorted seed list, new seed values can be easily added without the need for any explicit synchronization. The addition of new seeds does not interfere with, nor does it invalidate, the linkage among domain values already inserted in the hash table. The sorted and unsorted seed list can be merged, periodically, with the old list being maintained until current readers have completed the reader's traversal.

The only write operation in promoting seed function 140 is writing a new seed in the unsorted seed list, which can be done latch-free using compare-and-swap (CAS) operations. No coordination is required; whether concurrent readers read the new seed value in time or not, the correctness is not affected. The hashed keys are already linked at this point. The worst case would be that the reader will unnecessarily choose a smaller seed and will be forced to follow a longer chain of hashed keys to find the desired key, but the reader will find the desired key.

Figure 4:
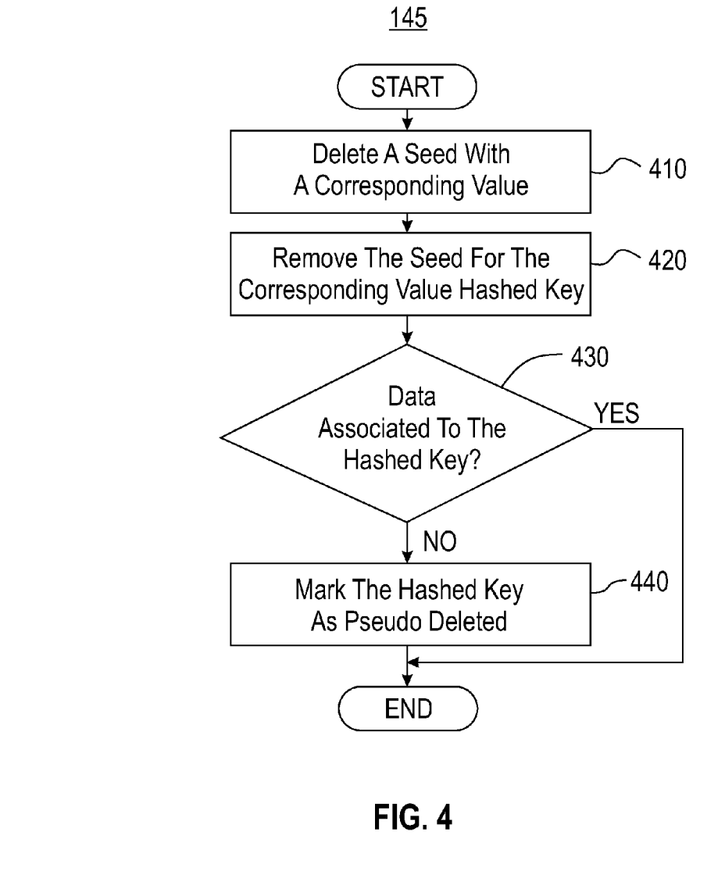
FIG. 4 depicts a flowchart of the steps of a deleting seed function, executing within the computing system of FIG. 1, for deleting seeds for an R-Hash index on a dimension of a multidimensional data set, in accordance with an embodiment of the present invention.

FIG. 4 depicts a flowchart of the steps of a deleting seed function, executing within the computing system of FIG. 1, in accordance with an embodiment of the present invention. Deleting seed function 145 deletes seeds for an R-Hash index on a dimension of a multidimensional data set, in accordance with one embodiment of the present invention.

In step 410, deleting seed function 145 deletes (selects for deletion) a seed with a corresponding value, based on at least one of insertion history, historical data, extrapolation techniques, ranking/scoring functions, seeds distance functions, and/or domain knowledge. The desired hashed key and corresponding seed entry are identified. In one embodiment, deleting seed function 145 ends when the corresponding hashed key to the desired seed is marked as "pseudo deleted" and unlinked from the chain of hashed keys. In other embodiments, in addition to marking the desired seed as pseudo deleted, deleting seed function 145 ends when the desired seed and corresponding hashed key are physically deleted.

In step 420, deleting seed function 145 removes the seed for the corresponding value hashed key. Once the seed is identified, deleting seed function 145 marks the seed as pseudo deleted. Pseudo deleted means the element is marked (but still present) in a way that cannot be read by the reader. There is no effect on current readers, because the keys in the hash table are not affected. The pseudo deleted seed becomes invisible to new readers and new readers are forced to use other seed values.

In decision 430, deleting seed function 145 determines whether there is data associated to the hashed key. The data associated to the hashed key would be found in the hash bucket in the hash table. If there is data associated to the hashed key (decision 430, yes branch), deleting seed function 145 ends. The hashed key would remain linked, and intact, in the chain of hashed keys. If there is no data associated to the hashed key (decision 430, no branch), meaning the hashed key was just a placeholder hashed key, deleting seed function 145 marks the hashed key as pseudo deleted (step 440). The reasoning is if there is data in the hash buckets, there needs to be a hashed key that maps the key to the key's corresponding value in the hash bucket. Conversely, a seed does not have to exist for data in the hash bucket.

As previously stated, in some embodiments, deleting seed function 145 leaves the pseudo deleted elements as pseudo deleted. In other embodiments, deleting seed function 145 physically removes pseudo deleted elements. The physical deletion is done using existing latch-free algorithms, such as hazardous pointers or timestamp ordering for memory de-allocation.

Figure 5:
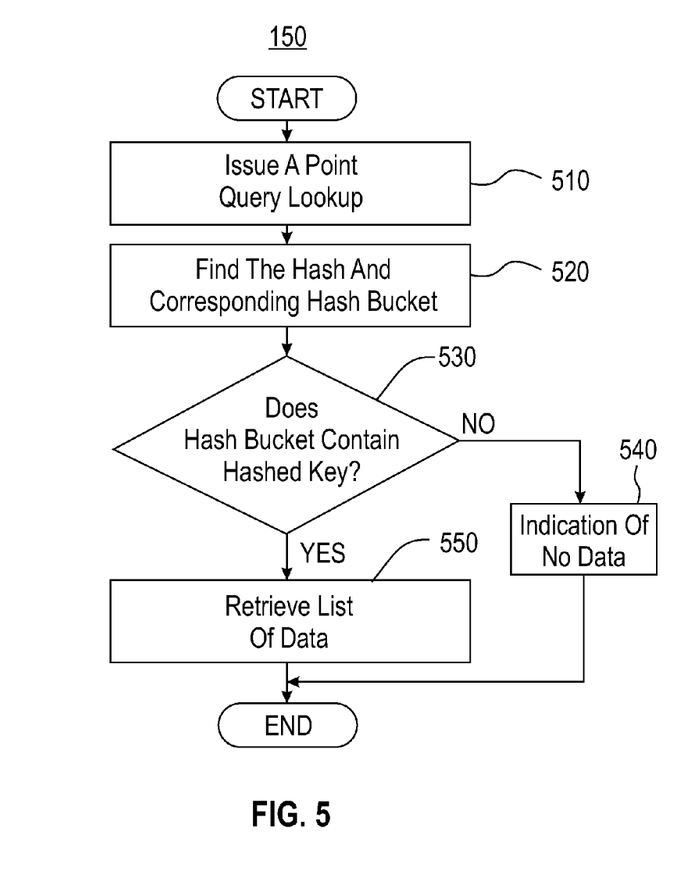
FIG. 5 depicts a flowchart of the steps of a searching data function, executing within the computing system of FIG. 1, for searching multidimensional data sets with a chosen value on a dimension using the R-Hash index on a dimension of a multidimensional data set, in accordance with an embodiment of the present invention.

FIG. 5 depicts a flowchart of the steps of a searching data function, executing within the computing system of FIG. 1, in accordance with an embodiment of the present invention. Searching data function 150 searches multidimensional data sets with a chosen value on a dimension using the R-Hash index on a dimension of a multidimensional data set, in accordance with one embodiment of the present invention.

In step 510, searching data function 150 issues a point query lookup. In one embodiment, the point query comes from a user. In other embodiments, the point query comes from an application or another program. For example, a student may need to find the population of a city. A point query issued may be the name of a city, and searching data function 150 uses the name of the city to find the population for that associated city.

In step 520, searching data function 150 finds the hash and corresponding hash bucket. The hash is created using a hash function. A hash function is any function that can be used to map digital data of arbitrary size to digital data of fixed size, with slight differences in input data producing very big differences in output data. The values returned by a hash function are called hash keys, hash values, hash codes, hash sums, or simply hashes. Searching data function 150 inserts a unique key into the hash function to map the unique key to the associated data located in the hash bucket. The hash function returns a hashed key, which is used to locate the hash bucket that contains the associated data of the unique key.

In decision 530, searching data function 150 determines whether the hash bucket contains the hash key. If the hash bucket does not contain the hash key (decision 530, no branch), searching data function 150 sends indication of no data to R-Hash program 130 (step 540). The indication of no data means there is no data in the hash table associated with the unique key used in the hash function to derive the hashed key. If the hash bucket does contain the hash key (decision 530, yes branch), searching data function 150 retrieves a list of data (step 550). The list of data is the data associated to the unique key used in the hash function to derive the hashed key. For example, the unique key could be a person's name and the data associated could be the person's telephone number.

Figure 6:
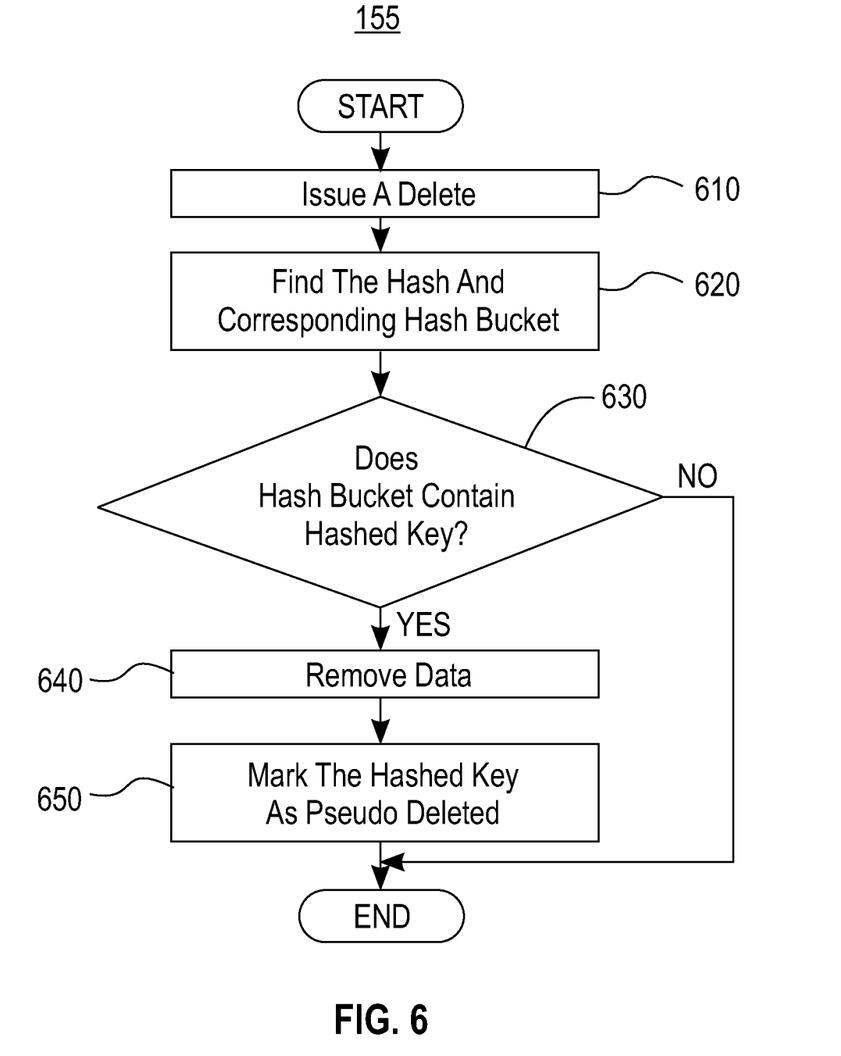
FIG. 6 depicts a flowchart of the steps of a deleting data function, executing within the computing system of FIG. 1, for deleting multidimensional data sets with a chosen value on a dimension using the R-Hash index on a dimension of a multidimensional data set, in accordance with an embodiment of the present invention.

FIG. 6 depicts a flowchart of the steps of a deleting data function, executing within the computing system of FIG. 1, in accordance with an embodiment of the present invention. Deleting data function 155 deletes multidimensional data sets with a chosen value on a dimension using the R-Hash index on a dimension of a multidimensional data set, in accordance with one embodiment of the present invention.

In step 610, deleting data function 155 issues a delete command (i.e., request for deletion). In one embodiment, the request for deletion comes from a user. In other embodiments, the request for deletion comes from an application or another program. For example, when a person changes his or her phone number, the current phone number associated with the person is no longer valid and needs to be deleted.

In step 620, deleting data function 155 finds the hash and corresponding hash bucket. The hash is created using a hash function. As detailed above, a hash function is any function that can be used to map digital data of arbitrary size to digital data of fixed size, with slight differences in input data producing very big differences in output data. The values returned by a hash function are called hash keys, hash values, hash codes, hash sums, or simply hashes. Deleting data function 155 inserts a unique key into the hash function to map the unique key to the associated data located in the hash bucket. The hash function returns a hashed key, which is used to locate the hash bucket that contains the associated data of the unique key.

In decision 630, deleting data function 155 determines whether the hash bucket contains the hashed key. If the hash bucket does not contain the hashed key (decision 630, no branch), deleting data function 155 ends. If the hash bucket does not contain the hashed key, there is no data in the hash bucket associated to the unique key used in the hash function to derive the hashed key. If the hash bucket does contain the hashed key (decision 630, yes branch), deleting data function 155 removes data (step 640). The data removed is the data associated to the unique key used in the hash function to derive the hashed key.

In step 650, deleting data function 155 marks the hashed key as pseudo deleted. When there is no longer any data associated to the unique key from which the hashed key was derived, there is no longer any need for the hashed key. In one embodiment, deleting data function 155 marks the hashed key for the unique key associated with the recently removed data as pseudo deleted, which will unlink the hashed key from the other hashed keys in the chain of hashed keys. In other embodiments, deleting data function 155 physically removes pseudo deleted elements. The physical deletion is done using existing latch-free algorithms, such as hazardous pointers or timestamp ordering for memory de-allocation.

Figure 7:
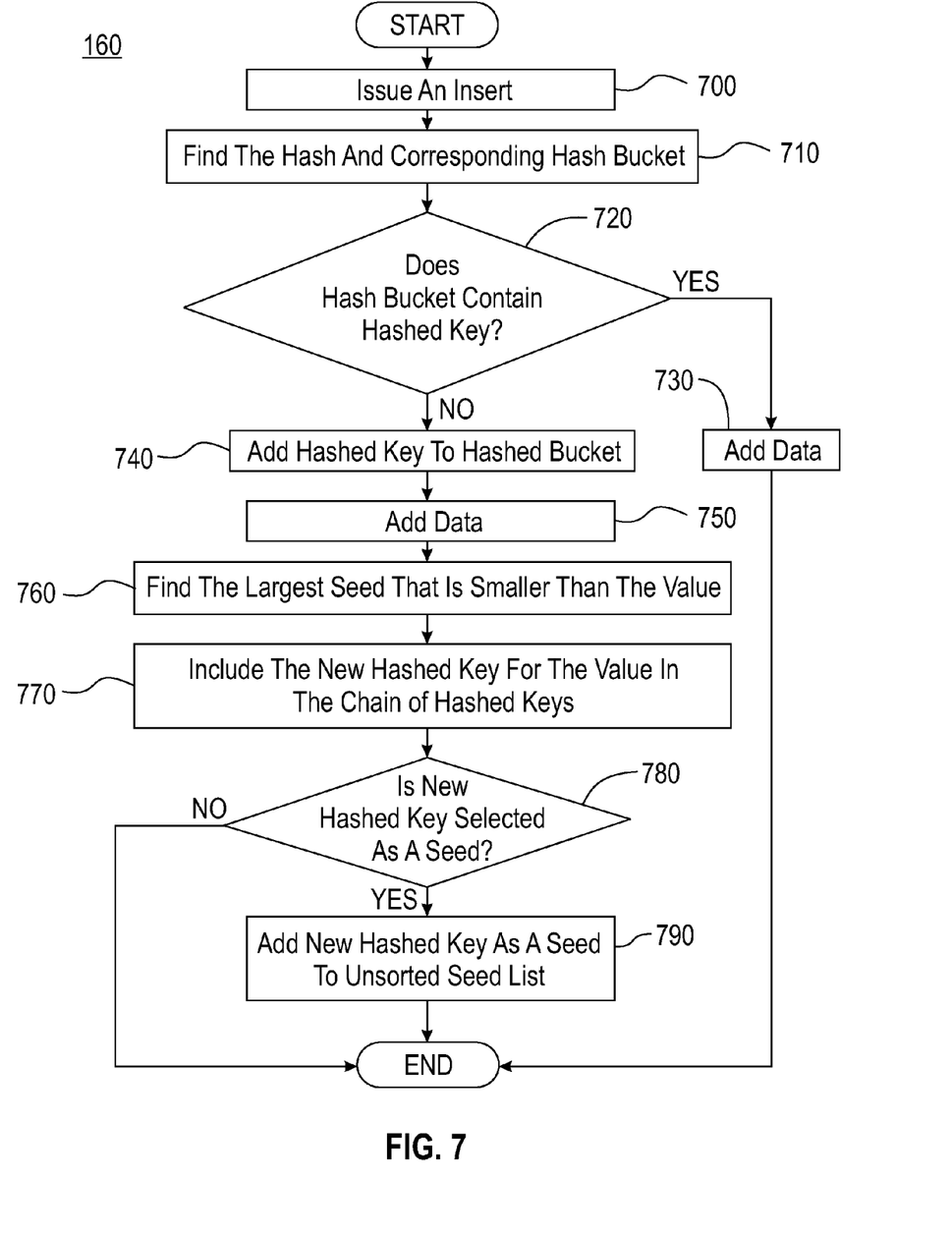
FIG. 7 depicts a flowchart of the steps of an inserting data function, executing within the computing system of FIG. 1, for inserting multidimensional data sets with a chosen value on a dimension using the R-Hash index on a dimension of a multidimensional data set, in accordance with an embodiment of the present invention.

FIG. 7 depicts a flowchart of the steps of an inserting data function, executing within the computing system of FIG. 1, in accordance with an embodiment of the present invention. Inserting data function 160 inserts multidimensional data sets with a chosen value on a dimension using the R-Hash index on a dimension of a multidimensional data set, in accordance with one embodiment of the present invention.

In step 700, inserting data function 160 issues an insert command (request for insertion). In one embodiment, the request for insertion comes from a user. In other embodiments, the request for insertion comes from an application or another program. For example, the person referred to in step 610 of FIG. 6 now has a new phone number. The new phone number needs to be added to allow a valid phone number to be found during future point or range queries.

In step 710, inserting data function 160 finds the hash and corresponding hash bucket. The hash is created using a hash function. A hash function is any function that can be used to map digital data of arbitrary size to digital data of fixed size, with slight differences in input data producing very big differences in output data. The values returned by a hash function are called hash keys, hash values, hash codes, hash sums, or simply hashes. Inserting data function 160 inserts a unique key into the hash function to map the unique key to the associated data located in the hash bucket. The hash function returns a hashed key, which is used to locate the hash bucket that contains the associated data of the unique key.

In decision 720, inserting data function 160 determines whether the hash bucket contains the hashed key. If the hash bucket does contain the hashed key (decision 720, yes branch), inserting data function 160 adds data to the hash bucket (step 730). The added data is the data associated to the unique key used in the hash function to derive the hashed key. For example, the unique key could be a person's name and the data associated could be the person's address. If the hash bucket does contain the hashed key, then the unique key has multiple values (or pieces of data) associated. For example, the unique key could be a person's name. There could already be data associated with the person's name, such as the person's height. The new data that inserting data function 160 may have could be the person's weight. Therefore, the person's weight would be added to the same hash bucket as the person's height.

If the hash bucket does not contain the hashed key (decision 720, no branch), meaning there is no previous data associated with the unique key, inserting data function 160 adds the hashed key to the hash bucket (step 740). Inserting data function 160 adds the hashed key to the hash bucket to allow data associated with the unique key, from which the hashed key was derived, to be added to the hash bucket.

In step 750, inserting data function 160 adds data. Now that the hashed key has been added to the hash bucket, data associated with the unique key can be added to the hash bucket. The data being added will be the initial data associated with the unique key. In the future, when there becomes other data associated with the unique key that needs to be added to the hash bucket, inserting data function 160 adds the data as in step 730. After the new data is added to the hash bucket, inserting data function 160 would end.

In step 760, in one embodiment, inserting data function 160 finds the largest seed that is smaller than the value (for forward linking). In another embodiment, inserting data function 160 finds the smallest seed that is larger than the value of the hashed key (for backward linking). Inserting data function 160 finds the seed to allow the new hashed key to be linked in order with the other hashed keys in the chain of hashed keys.

In step 770, inserting data function 160 includes the new hashed key for the value in the chain of hashed keys. Using the seed found in step 760, the new hashed key is inserted into the chain of hashed keys and linking is established. The linking is essentially an insertion into a linked list of hashed keys, which can be done using a latch-free linked operation, such as hazardous pointers that rely on compare-and-swap (CAS) operations.

In decision 780, inserting data function 160 determines whether the new hashed key is selected as a seed. The determination is obtained using certain selection criteria or techniques, such as the criteria and techniques expressed in steps 210, 310, and 410 of FIGS. 2, 3, and 4, respectively. If the new hashed key is not selected as a seed (decision 780, no branch), inserting data function 160 ends. If the new hashed key is selected as a seed (decision 780, yes branch), inserting data function 160 adds the new hashed key as a seed to an unsorted seed list (step 790). By maintaining an unsorted seed list, new seed values can be easily added without the need for any explicit synchronization. The addition of new seeds does not interfere with, nor does it invalidate, the linkage among domain values already inserted in the hash table. The sorted and unsorted seed list can be merged, periodically, and the old list is maintained until current readers have completed the reader's traversal.

The write operation to add a new seed to the unsorted seed list in inserting data function 160 can be done latch-free using CAS operations. No coordination is required; whether concurrent readers read the new seed value in time or not, the correctness is not affected. The hashed keys are already linked at this point. The worst case is the reader will unnecessarily choose a smaller seed and will be forced to follow a longer chain of hashed keys to find the desired key, but the reader will find the desired key.

Figure 8:
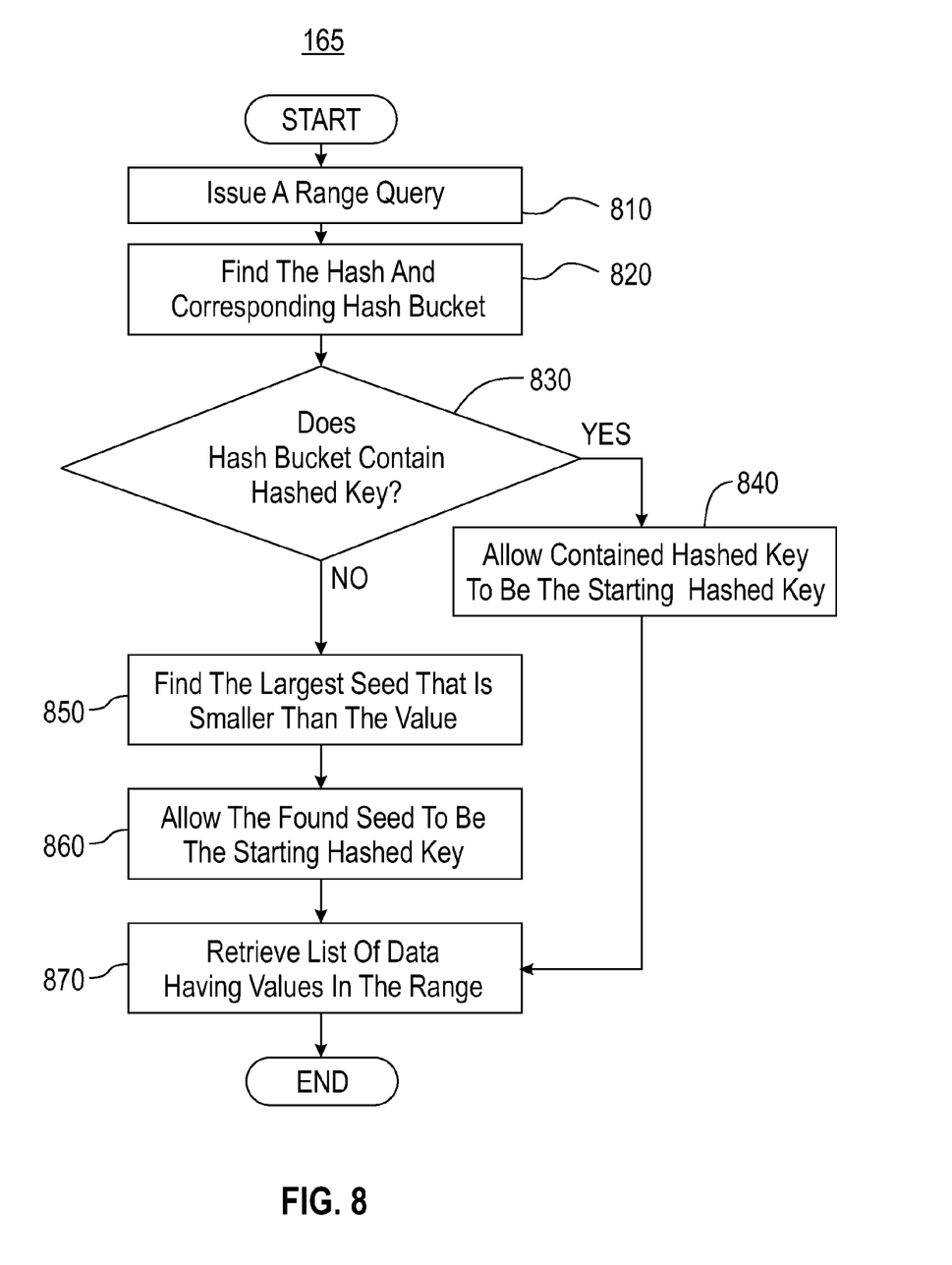
FIG. 8 depicts a flowchart of the steps of a range query function, executing within the computing system of FIG. 1, for analyzing a range query on multidimensional data sets with a chosen value range on a dimension using the R-Hash index on a dimension of a multidimensional data set, in accordance with an embodiment of the present invention.

FIG. 8 depicts a flowchart of the steps of a range query function, executing within the computing system of FIG. 1, in accordance with an embodiment of the present invention. Range query function 165 analyzes a range query on multidimensional data sets with a chosen value range on a dimension using the R-Hash index on a dimension of a multidimensional data set, in accordance with one embodiment of the present invention.

In step 810, range query function 165 issues a range query. In one embodiment, the range query comes from a user. In other embodiments, the range query comes from an application or another program. A range query consists of preprocessing some input data into a data structure to efficiently answer any number of queries on any subset of the input. A range query is a common database operation that retrieves records where some value is between an upper and lower boundary. For example, the input data could be everyone working at a particular company with each person's respective salary. The range query could be everyone at the company with salaries between $50,000 and $200,000.

In step 820, range query function 165 finds the hash and corresponding hash bucket. The hash is created using a hash function. A hash function is any function that can be used to map digital data of arbitrary size to digital data of fixed size, with slight differences in input data producing very big differences in output data. The values returned by a hash function are called hash keys, hash values, hash codes, hash sums, or simply hashes. Range query function 165 inserts a unique key into the hash function to map the unique key to the associated data located in the hash bucket. The hash function returns a hashed key, which is used to locate the hash bucket that contains the associated data of the unique key.

Because range query function 165 deals with range queries, there are at least two unique keys being used; for example, a range between [key 1, key 2]. In step 820, in one embodiment, range query function 165 will find the hash of key 1 if forward linking is used. Conversely, in other embodiments, range query function 165 will find the hash of key 2 if backward linking is used.

In decision 830, range query function 165 determines whether the hash bucket contains the hashed key. If the hash bucket does contain the hashed key (decision 830, yes branch), range query function 165 allows the hashed key to be the starting hashed key (step 840). Range query function 165 begins with the hashed key chosen to be the starting hashed key, and walks (reads) through hashed keys until ending hashed key is reached. The ending hashed key is derived from the other key in the initial range query. If the hash bucket does not contain the hashed key (decision 830, no branch), in one embodiment, range query function 165 finds the largest seed that is smaller than the value (for forward linking) (step 850). In another embodiment, range query function 165 finds the smallest seed that is larger than the value of the hashed key (for backward linking). Range query function 165 finds the seed to allow the new hashed key to be linked in order with the other hashed keys in the chain of hashed keys.

In step 860, range query function 165 allows the found seed to be the starting hashed key. For example, the hashed key had a value of 4, but there was no data in the hash bucket associated with the hashed key of value 4. If there were seeds with values of 2, 3, 5, 6, 7, 8, and 9, range query function 165 allows the seed of value 3 (largest seed that is smaller than 4) to be the starting hashed key.

In step 870, range query function 165 retrieves a list of data, having values in the range. Range query function 165 begins with the starting hashed key and walks (reads) through the chain of hashed keys. Range query function 165 stops when the hashed key is out of the range of the initial range query. While in range, range query function 165 retrieves the list of data having values within the range of the initial range query.

The present invention may use forward linking, backward linking, and/or double linking for any linking mentioned in any of the embodiments presented. The lack of all three linking possibilities being mentioned does not, in any way, limit the possibility that all three (forward, backward, and/or double) may be used. Additionally, the present invention may leverage an order-preserving hash function to improve the locality of access (reduce random access when chasing forward links) and ensure that following forward (or backward) links translates to physically forward lookups, where prefetching will be possible.

Figure 9:
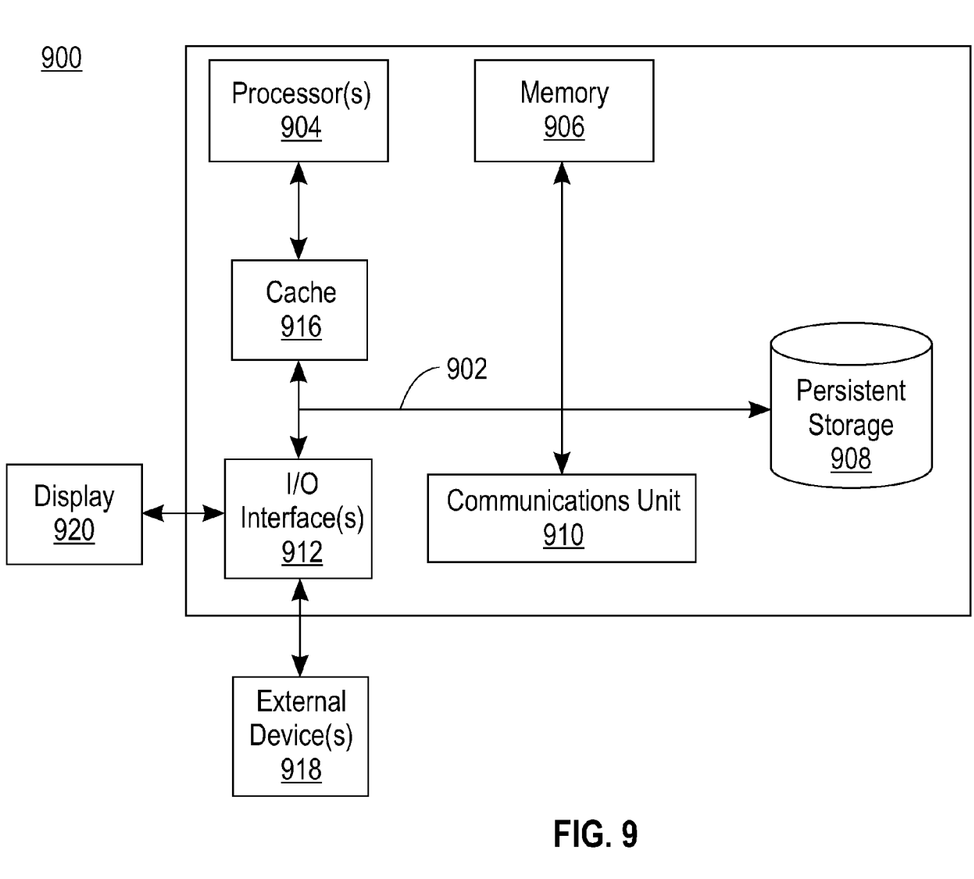
FIG. 9 depicts a block diagram of components of a computer system, in accordance with an embodiment of the present invention.

FIG. 9 depicts a block diagram of components of computer system 900, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computer system 900 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of processors 904 by holding recently accessed data and data near accessed data from memory 906.

Program instructions and data used to practice embodiments of the present invention may be stored in persistent storage 908 for execution by one or more of the respective processors 904 via cache 916 and one or more memories of memory 906. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Program instructions and data used to practice embodiments of the present invention may be downloaded to persistent storage 908 through communications unit 910.

I/O interface(s) 912 allows for input and output of data with other devices that may be connected to each computer system. For example, I/O interface 912 may provide a connection to external device(s) 918, such as keyboard, keypad, a touch screen, and/or some other suitable input device. External device(s) 918 can also include portable computer readable storage media (e.g., thumb drives, portable optical or magnetic disks, and memory cards). Software and data used to practice embodiments of the present invention can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for supporting queries for hash-based data structures, the method comprising:
   creating, by one or more processors, an ordered set of seeds, wherein the ordered set of seeds are a subset of values in a key domain;
   linking, by one or more processors, each hashed key of a plurality of hashed keys to at least another hashed key of the plurality of hashed keys using the ordered set of seeds, wherein the linking is done using a latch-free linked operation, wherein the latch-free linked operation includes hazardous pointers that rely on compare-and-swap operations;
   receiving, by one or more processors, a range query, wherein the range query has a lower boundary hashed key and an upper boundary hashed key, and wherein the range query includes preprocessing an input into a data structure to efficiently answer multiple queries on multiple subsets of the input;
   determining, by one or more processors, that a hash bucket corresponding to the lower boundary hashed key has no corresponding value to the lower boundary hashed key;
   locating, by one or more processors, a largest seed of the ordered set of seeds smaller than the lower boundary hashed key;

identifying, by one or more processors, a hashed key corresponding to located largest seed of the ordered set of seeds smaller than the lower boundary hashed key as a starting hashed key; and retrieving, by one or more processors, a list of data.

2. The method of claim 1, further comprising:

sharing, by one or more processors, a hash table address directory, associated with the plurality of hash keys, among a set of hash indexes using an indirectional level that maps each hash bucket, associated with at least one hashed key, of the hash table address directory to the set of hash indexes.

3. The method of claim 1, further comprising:

subsequent to linking each hashed key of the plurality of hashed keys to at least another hashed key of the plurality of hashed keys, inserting, by one or more processors, an additional hashed key to the plurality of hashed keys;

identifying, by one or more processors, a hashed key, based on the additional hashed key and the ordered set of seeds; and linking, by one or more processors, the additional hashed key to at least the identified hashed key.

4. The method of claim 3, wherein identifying the hashed key comprises:

locating, by one or more processors, a smallest seed of the ordered set of seeds larger than the additional hashed key; and identifying, by one or more processors, a hashed key corresponding to located smallest seed of the ordered set of seeds larger than the additional hashed key.

5. The method of claim 3, wherein identifying the hashed key comprises:

locating, by one or more processors, a largest seed of the ordered set of seeds smaller than the additional hashed key; and identifying, by one or more processors, a hashed key corresponding to located largest seed of the ordered set of seeds smaller than the additional hashed key.

6. The method of claim 1, wherein creating the ordered set of seeds comprises:

promoting, by one or more processors, values within the key domain as an initial set of seeds;

adding, by one or more processors, hashed keys for the promoted values within the key domain to a corresponding hash bucket;

inserting, by one or more processors, the hashed keys for the promoted values within the key domain into a chain of hashed keys; and storing, by one or more processors, the initial set of seeds into a sorted seed list as the ordered set of seeds.

7. A computer program product for supporting queries for hash-based data structures, the computer program product comprising:

one or more computer readable storage media and program instructions stored on the one or more computer readable storage media, the program instructions comprising:

program instructions to create an ordered set of seeds, wherein the ordered set of seeds are a subset of values in a key domain;

program instructions to link each hashed key of a plurality of hashed keys to at least another hashed key of the plurality of hashed keys using the ordered set of seeds, wherein the linking is done using a latch-free linked operation, wherein the latch-free linked operation includes hazardous pointers that rely on compare-and-swap operations;

program instructions to receive a range query, wherein the range query has a lower boundary hashed key and an upper boundary hashed key, and wherein the range query includes preprocessing an input into a data structure to efficiently answer multiple queries on multiple subsets of the input;

program instructions to determine that a hash bucket corresponding to the lower boundary hashed key has no corresponding value to the lower boundary hashed key;

program instructions to locate a largest seed of the ordered set of seeds smaller than the lower boundary hashed key;

program instructions to identify a hashed key corresponding to located largest seed of the ordered set of seeds smaller than the lower boundary hashed key as a starting hashed key; and program instructions to retrieve a list of data.

8. The computer program product of claim 7, further comprising:

program instructions, stored on the one or more computer readable storage media, to share a hash table address directory, associated with the plurality of hash keys, among a set of hash indexes using an indirectional level that maps each hash bucket, associated with at least one hashed key, of the hash table address directory to the set of hash indexes.

9. The computer program product of claim 7, further comprising:

program instructions, stored on the one or more computer readable storage media, to, subsequent to linking each hashed key of the plurality of hashed keys to at least another hashed key of the plurality of hashed keys, insert an additional hashed key to the plurality of hashed keys;

program instructions, stored on the one or more computer readable storage media, to identify a hashed key, based on the additional hashed key and the ordered set of seeds; and program instructions, stored on the one or more computer readable storage media, to link the additional hashed key to at least the identified hashed key.

10. The computer program product of claim 9, wherein program instructions to identify the hashed key comprise:

program instructions to locate a smallest seed of the ordered set of seeds larger than the additional hashed key; and program instructions to identify a hashed key corresponding to located smallest seed of the ordered set of seeds larger than the additional hashed key.

11. The computer program product of claim 9, wherein program instructions to identify the hashed key comprise:

program instructions to locate a largest seed of the ordered set of seeds smaller than the additional hashed key; and program instructions to identify a hashed key corresponding to located largest seed of the ordered set of seeds smaller than the additional hashed key.

12. The computer program product of claim 7, wherein creating the ordered set of seeds comprises:

promoting, by one or more processors, values within the key domain as an initial set of seeds;

adding, by one or more processors, hashed keys for the promoted values within the key domain to a corresponding hash bucket;

inserting, by one or more processors, the hashed keys for the promoted values within the key domain into a chain of hashed keys; and storing, by one or more processors, the initial set of seeds into a sorted seed list as the ordered set of seeds.

13. A computer system for supporting queries for hash-based data structures, the computer system comprising:

one or more computer processors, one or more computer readable storage media, and program instructions stored on the computer readable storage media for execution by at least one of the one or more processors, the program instructions comprising:

program instructions to create an ordered set of seeds, wherein the ordered set of seeds are a subset of values in a key domain;

program instructions to link each hashed key of a plurality of hashed keys to at least another hashed key of the plurality of hashed keys using the ordered set of seeds, wherein the linking is done using a latch-free linked operation, wherein the latch-free linked operation includes hazardous pointers that rely on compare-and-swap operations;

program instructions to receive a range query, wherein the range query has a lower boundary hashed key and an upper boundary hashed key, and wherein the range query includes preprocessing an input into a data structure to efficiently answer multiple queries on multiple subsets of the input;

program instructions to determine that a hash bucket corresponding to the lower boundary hashed key has no corresponding value to the lower boundary hashed key;

program instructions to locate a largest seed of the ordered set of seeds smaller than the lower boundary hashed key;

program instructions to identify a hashed key corresponding to located largest seed of the ordered set of seeds smaller than the lower boundary hashed key as a starting hashed key; and program instructions to retrieve a list of data.

14. The computer system of claim 13, further comprising:
program instructions, stored on the computer readable storage media for execution by at least one of the one or more processors, to share a hash table address directory, associated with the plurality of hash keys, among a set of hash indexes using an indirectional level that maps each hash bucket, associated with at least one hashed key, of the hash table address directory to the set of hash indexes.

15. The computer system of claim 13, further comprising:
program instructions, stored on the computer readable storage media for execution by at least one of the one or more processors, to, subsequent to linking each hashed key of the plurality of hashed keys to at least another hashed key of the plurality of hashed keys, insert an additional hashed key to the plurality of hashed keys;

program instructions, stored on the computer readable storage media for execution by at least one of the one or more processors, to identify a hashed key, based on the additional hashed key and the ordered set of seeds; and program instructions, stored on the computer readable storage media for execution by at least one of the one or more processors, to link the additional hashed key to at least the identified hashed key.

16. The computer system of claim 15, wherein program instructions to identify the hashed key comprise:

program instructions to locate a smallest seed of the ordered set of seeds larger than the additional hashed key; and program instructions to identify a hashed key corresponding to located smallest seed of the ordered set of seeds larger than the additional hashed key.

17. The computer system of claim 15, wherein program instructions to identify the hashed key comprise:

program instructions to locate a largest seed of the ordered set of seeds smaller than the additional hashed key; and program instructions to identify a hashed key corresponding to located largest seed of the ordered set of seeds smaller than the additional hashed key.

* * * * *